Patented Mar. 26, 1935

1,995,614

UNITED STATES PATENT OFFICE 1,995,614

CATALYTIC OXIDATION OF CYCLIC COMPOUNDS CONTAINING OXYGEN IN THE RING

Alphons O. Jaeger, Crafton, Pa., assignor, by mesne assignments, to American Cyanamid & Chemical Corporation, a corporation of Delaware No Drawing. Application January 30, 1929, Serial No. 336,334

12 Claims. (Cl. 260—123)

This invention relates to the oxidation of cyclic compounds containing oxygen in the ring, which rings contain carbon atoms having the following grouping:

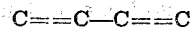

Examples of such compounds are those containing the furane group, especially furfural and its homologues, which are cheap and available in enormous quantities. I have found that the grouping given above appears to be very stable in vapor phase catalytic oxidations and when the ring splits, compounds containing this carbon grouping are formed. Under ordinary reaction conditions the end carbons are oxidized to carboxyl groups forming dibasic acids, thus under certain conditions and catalysts, maleic and fumaric acids constitute the main product, while under other conditions the main product may be mesotartaric acid which represents a further stage of oxidation and which likewise appears to be a very stable compound.

The raw materials which may be used in the present invention include all heterocyclic compounds containing oxygen in the ring and also containing the carbon atom grouping described above. The compounds containing the furane nucleus represent the most important source of raw material at the present time owing to the low price and ready availability of the furfurals, but the reaction is not limited to the oxidation of cyclic aldehydes, such as furfural, being equally applicable to other compounds containing the furane nucleus or other oxygen rings containing the carbon groups given above.

The oxidation is carried out under ordinary catalytic temperatures ranging from 250 to 600° C. and preferably from 350 to 550° C. A large number of catalysts can be used, in fact all the ordinary oxidation catalysts are effective, these including primarily compounds of the metal elements of the fifth and sixth groups of the periodic system and other elements such as, for example, platinum metals which are also oxidation catalysts. While the invention is in no sense limited to any particular type of oxidation catalysts, I have found that the best results are obtained when stabilized catalysts are used, that is to say catalysts containing compounds of the alkali metals, alkaline earth metals and earth metals whose oxides are not reducible with hydrogen, these metals including beryllium, aluminum and the more strongly basic earth metals which are characterized by the fact that their oxides are not reducible by hydrogen. The stabilized catalysts which are more perfectly tuned to the reaction give the best yields and constitute the preferred type for use in the present invention. In addition to stabilizers, it is also frequently desirable to incorporate other catalytic components which are not specific catalysts for the particular reaction such as, for example, dehydrogenation, dehydration catalysts, etc. These non-specific catalysts are known as "stabilizer promoters" and appear to enhance the action of the stabilizer although the invention is in no sense limited to this particular theory of action of stabilizer promoters and it is possible that the effect of the stabilizer promoters may be due partly or wholly to other factors.

While stabilized catalysts of the most various type give excellent results, I have found that complex compounds such as the base exchange bodies, either zeolites or non-siliceous, and their derivatives are especially effective. These complex compounds in which stabilizers and in some cases stabilizer promoters are united in a chemical and physical structure having most desirable characteristics for catalyses may be considered as the most effective catalysts for use in the present invention. Catalysts containing base exchange bodies or their derivatives will be generically referred to as "permutogenetic bodies" and it should be understood that this term when use in the specification and claims will have no other meaning.

Base exchange bodies which may enter into the contact masses used in the present invention include zeolites, both those which are the reaction products of two different types of components, such as silicates and metallates or silicates and metal salts, and multi-component zeolites which are the reaction product of at least one silicate, at least one metallate and at least one metal salt. The non-siliceous base exchange bodies do not contain silica and are usually the reaction products of a metallate and a metal salt, the term metal salt being used, of course, to include only salts of metals which are capable of entering into the non-exchangeable nucleus of the base exchange body. Derivatives of base exchange bodies such as the reaction products with anions to form salt like bodies and derivatives such as leached base exchange bodies are also included in the term "permutogenetic bodies". The permutogenetic bodies are advantageously diluted, preferably to form a physically homogeneous structure, preferably using diluents of high porosity which may or may not contain catalytically active or stabilizer promoter components.

It should be understood that the oxidation of organic compounds generally by means of stabilized catalysts is not claimed in the present invention, this forming the subject matter of my prior Patent No. 1,709,853 dated April 23, 1929 of which this application is in part a continuation. Likewise the oxidation of organic compounds with two-component zeolites is not claimed here broadly, this forming the subject matter of my prior Patent No. 1,694,122, dated Dec. 4, 1928. The oxidation of organic compounds generally by means of non-siliceous base exchange bodies is also not claimed, this forming the subject matter of my prior Patent No. 1,735,763 dated November 12, 1929, of which this application is also in part a continuation, and the oxidation of organic compounds generally by means of multi-component zeolites and leached base exchange bodies is not claimed here broadly, this forming the subject matter of my prior Patent No. 1,722,297 dated July 30, 1929 and my co-pending application Serial No. 294,597 filed July 21, 1928 respectively, of which the present application is also in part a continuation.

I have found that the oxidation of compounds containing oxygen rings with the symmetrical butylene or butadiene carbon atom arrangement is delicate and requires accurate temperature control and a finely toned catalyst for best results, there being a considerable tendency to losses by total combustion or other undesired reactions. While excellent results may be obtained by suitable catalysts, especially well adjusted stabilized catalysts, it is desirable in many cases to carry out the reaction in the presence of protective compounds many of which are more readily oxidized than the oxygen ring compound itself. These compounds appear to protect the desired reaction products because they tend to utilize the more active oxygen in the catalyst and thus moderate the activity of the reaction itself. It should be understood that the invention is not limited to any theory of action of protective catalysis. An example of such a protective compound is methyl alcohol, aliphatic compounds, such as petroleum fractions, etc. Thus, for example, if furfural and methyl alcohol are mixed and oxidized under suitable conditions, excellent yields of formaldehyde are obtained and very much higher yields of maleic or mesotartaric acid result, depending on the reaction conditions and on the catalyst. Not only does the methyl alcohol protect the oxidation product of the furfural but the furfural also appears to dilute the methyl alcohol as excellent yields of formaldehyde are obtained. It should be understood that this protective catalysis is not claimed broadly in the present invention, this forming the subject matter of my co-pending application, Serial No. 338,614 filed Feb. 8, 1929, but is included as a preferred modification in connection with the oxidation of the heterocyclic compounds which form the subject matter of the present invention.

The catalysis of the present invention may be carried out with air as an oxidizing agent or various artificial oxidizing gases, such as mixtures of oxygen and nitrogen in different proportions than found in air, mixtures of carbon dioxide and oxygen, and the like may be used. It is frequently desirable to recirculate part of the reacted gases with or without removal of part or all of the reaction product and such recirculation processes are included in the present invention.

Instead of using easily oxidizable agents for recirculating as described above, it is sometimes of advantage to add inert or difficultly oxidizable vapors to the reaction gas mixture such as, for example, vapors of carbon tetrachloride or other chlorinated aliphatic compounds. These vapors appear to protect the oxycyclic compounds from total combustion. It is probable that the main effect is one of dilution but the exact behavior of these relatively inert vapors in the catalysis is not definitely known, and the above explanation is merely given as the most probable without limiting this modification of the invention to any particular theory of action.

The invention will be described in greater detail in connection with the use of the following specific examples which illustrate a few typical embodiments of the invention, without, however, limiting its scope to the precise details therein set forth.

*Example 1*

250 volumes of 8-12 mesh aluminum granules are coated with a solution containing 24 parts of ammonium metavanadate. The coating may be effected by spraying the ammonium metavanadate solution onto the granules which are stirred and heated to a temperature at which the water in the ammonium metavanadate solution is instantly vaporized on contact with the granules, producing a very uniform coating.

The contact mass is then calcined at 450° C. in a stream of air and filled into the tubes of a tubular bath converter which is provided with ½–¾ inch tubes. The catalyst layer in the tubes is 4–8 inches high. A bath of mercury alloy such as a mercury cadmium or mercury lead alloy is used, which bath boils between 370–400° C.

Crude furfural is uniformly vaporized with air in the ratio of 1:35 by weight and passed through the contact mass at a bath temperature of 370° C. Yields of from 45–50% of the theory of a mixture of maleic anhydride and mesotartaric acid are obtained.

The yields of maleic acids and mesotartaric acid can be greatly increased by using the so-called protective catalysis which forms the subject matter of my copending application Serial No. 338,614 filed Feb. 8, 1929. An excellent protective agent for the reaction is methyl alcohol which is vaporized with the furfural preventing to a great extent total combustion and greatly increasing the yields. Formaldehyde, of course, is obtained as a by-product which may be easily separated from the maleic and mesotartaric acids.

Instead of using protective catalysis, the oxidation may be carried out in circulatory process in which the exhaust gases are recirculated after suitable adjustment of composition by the addition of fresh furfural and air or oxygen. In such a process it is desirable to maintain an oxygen content lower than that of air. With the lower oxygen content there is less loss from total combustion and yields up to 70–75% of the theory are obtainable.

Instead of using vanadium pentoxide as a catalytic component in the contact mass, other metal acids of the 5th and 6th groups of the periodic system may be used, such as molybdenum oxide, and tungsten oxide or a mixture of the two. Salts of the metal acids of the 5th and 6th groups of the periodic system are very efficient, such as for example, aluminum vanadate, titanium vanadate, zirconium vanadate, manganese vanadate or the corresponding molybdates, tungstates or tantalates. A plurality of the above salts may also be used.

Instead of using aluminum granules as a massive carrier other carriers may be employed, such as for example, fragments of cast iron or of metal alloys for instance ferrovanadium, ferrochrome and the like. These metal granules preferably should be treated to roughen their surface. Other carrier fragments of natural or artificial origin may be used, such as for example, material rich in silica, as quartz fragments, quartz filter stones, sand stones, diatomaceous stones, fragments of pumice and various kinds of silicates. However, aluminum granules are among the best carriers for this reaction and appear to exert a favorable influence.

Example 2

300 parts of $V_2O_5$ are intimately mixed with 93.186 parts of silver nitrate and are then melted. The melt is permitted to cool, puffing up on cooling with loss of oxygen, and is then broken into pea-size fragments, the product being a silver vanadyl vanadate, a non-siliceous base exchange body. The contact mass is ready for use without further treatment.

Instead of preparing silver vanadyl vanadate, the corresponding vanadyl vanadates of potassium, lithium, rubidium or caesium may be used. They are non-siliceous base exchange bodies normally containing the following ratio of $V_2O_5$ to alkali:

$V_2O_5$ to $K_2O$ as 5:1
$V_2O_5$ to $Li_2O$ as 2:1
$V_2O_5$ to $Rb_2O$ as 5:1
$V_2O_5$ to $Cs_2O$ as 5:1

While these alkali metal vanadyl vanadates may be used as contact mass without further treatment somewhat better results are obtained by exchanging part of the exchangeable alkali for other metal oxides. Base exchange is effected by hydrating the granules obtained from the fusion and then treating them with 5–10% solutions of one or more metal salts, such as aluminum sulfate, copper sulfate, cobalt sulfate, etc.

The contact mass is filled into a converter, such as that described in Example 1, and furfural, furfuryl alcohol, methyl furfural or other furane derivatives which are present in crude furfural are uniformly vaporized with a mixture of carbon dioxide and oxygen in the ratio of 1:35 by weight, the oxidizing gas containing about 10% oxygen. The mixture is then passed over the contact mass at 360–400° C. maleic anhydride being obtained as the main product in the form of long white needles. Preferably the process is carried out in a circulatory manner, the carbon dioxide and oxygen mixture being recirculated after removing the maleic anhydride and adding sufficient fresh furfural and oxygen. The yields can be further improved by adding small amounts of gasoline which acts as a protective agent since the aliphatic hydrocarbons contained therein appear to consume the most active oxygen during the reaction and tend to prevent total combustion of the maleic anhydride formed. Other aliphatic hydrocarbons may, of course, be used or a different type of protecting agent may be employed which is not readily oxidized, such as carbon tetrachloride or other chlorinated aliphatic hydrocarbons. When this type of protecting agent is used the action is probably due to actual dilution of the reacting components.

If desired, the non-siliceous base exchange bodies may be leached with dilute acids in order to remove part or all of the exchangeable base. This is effected by trickling 2–3% solutions of organic or inorganic acids over the granules of the base exchange bodies for a sufficient period of time to effect the desired leaching.

Example 3

1,000 parts of a natural base exchange body, or preferably, diluted or undiluted artificial base exchange body available in the trade for water softening purposes are treated with one or more 5–10% salt solutions, such as ferric sulfate, cobalt nitrate, aluminum sulfate, manganese sulfate, vanadyl sulfate, etc. After the base exchange has been effected the product is treated with water-soluble compounds of the metal acids of the 5th and 6th groups of the periodic system, such as ammonium vanadate or ammonium molybdate. The so-called salt-like body of the base exchange body is obtained. The salt-like bodies are then calcined at 400–500° C. in a stream of 7% $SO_2$ gases or a stream containing a corresponding amount of $SO_3$ gases. This calcination is not essential in all cases, but is desirable in many cases.

Furfural uniformly vaporized in an air stream in the ratio of 1:40 is passed over the contact mass in a converter, such as that described in Example 1, operated at the temperature there described. Good yields of maleic anhydride in the form of long white needles are obtained. Instead of using a large excess of air the oxygen content may be reduced to the theoretical amount or to about twice the theoretical amount necessary for carrying out the process. In this case however it is advantageous to employ carbon dioxide to furnish an additional bulk of gas and to carry out the reaction in a circulatory process.

Example 4

200 parts of 33° Bé. potassium waterglass solution diluted with 6–8 volumes of water are mixed with sufficient "Celite" until the suspension just remains easily stirrable. 18 parts of $V_2O_5$ are reduced to blue vanadyl sulfate by means of sulfur dioxide in hot aqueous solution acidified with sulfuric acid. Thereupon the vanadyl sulfate is transformed into the brown potassium vanadite by treatment with sufficient 10 N. caustic potash and the solution is mixed with the waterglass suspension, whereupon a 10–15% solution of aluminum sulfate is added in a thin stream with vigorous agitation until the reaction mixture is neutral or just alkaline to phenolphthalein. The mass solidifies to a dirty greenish gel which is filtered with suction, washed three times with 100 volumes of water and dried. It is a diluted base exchange body containing tetravalent vanadium, aluminum and $SiO_2$ in non-exchangeable form. Before use, the contact mass should be sprayed with sufficient sulfuric acid so that when a test sample is sludged in water the suspension is neutral to litmus or acid to congo. The sulfuric acid combines with the exchangeable alkali. The vanadium is the effective catalyst, the aluminum is a stabilizer promoter, and the alkali metal sulfate is a stabilizer.

Furfural is vaporized in an air stream as described in the foregoing examples and is passed over the contact mass under the reaction conditions therein set forth. Good yields of maleic anhydride can be obtained.

Instead of spraying the base exchange body with diluted sulfuric acid, it may be placed in a funnel and leached with 2–3% dilute sulfuric acid, nitric acid or hydrochloric acid in order to leach out part or all of the exchangeable alkali. These leached base exchange bodies can be used for the production of maleic anhydride and mesotartaric acid from compounds containing the furane nucleus or other oxycyclic compounds containing the above referred to carbon atom grouping. Preferably the leached base exchange bodies are mixed with 10% of their weight of compounds of the elements of the 1st and 2nd groups of the periodic system which act as stabilizers and which also at the same time act as cementing agents, increasing the mechanical strength of the contact mass. If the stabilizers are strong alkalies, they must be neutralized by inorganic acids such as nitric acid or sulfuric acid preferably by spraying the heated and stirred granules with the acid.

This application is partly a continuation of my co-pending applications Serial No. 196,393, filed June 3, 1927 which matured into Patent No. 1,709,853 dated April 23, 1929; No. 211,638, filed August 8, 1927 which matured into Patent No. 1,735,763 dated November 12, 1929; No. 215,759, filed August 26, 1927 which matured into Patent No. 1,722,297 dated July 30, 1929; No. 294,597, filed July 21, 1928.

What is claimed as new is:

1. A method of oxidizing heterocyclic compounds having oxygen in the ring, containing the following carbon atom group,

to straight chain dibasic acids or anhydrides containing 4 carbon atoms which comprises vaporizing the heterocyclic compound and admixing with an oxygen containing gas and passing over a contact mass capable of bringing about the union of oxygen with carbon and the splitting of heterocyclic chains containing at least one compound of a metal falling within the group consisting of alkali metals, alkaline earth metals and earth metals whose oxides are not reduced by hydrogen.

2. A method according to claim 1 in which the contact mass contains a compound of a metal element of the 5th and 6th groups of the periodic system.

3. A method according to claim 1 in which the contact mass contains vanadium.

4. A method according to claim 1 in which the contact mass contains vanadium and aluminum.

5. A method of oxidizing compounds containing the furane nucleus to dibasic straight chain acids or anhydrides containing four carbon atoms which comprises vaporizing the furane body, admixing with oxygen containing gas and passing it at an elevated temperature over a contact mass capable of bringing about the union of oxygen and carbon and the splitting of heterocyclic chains, said mass containing a metal falling within the group consisting of alkali metals, alkaline earth metals and earth metals whose oxides are not reduced by hydrogen.

6. A method of oxidizing furfural to straight chain dibasic acids or anhydrides containing 4 carbon atoms which comprises vaporizing furfural, admixing it with an oxidizing gas and passing it over a contact mass capable of bringing about the union of oxygen with carbon and the splitting of heterocyclic chains containing at least one compound of a metal falling within the group consisting of alkali metals, alkaline earth metals and earth metals whose oxides are not reduced by hydrogen.

7. A method according to claim 5 in which the contact mass contains at least one metal element of the 5th and 6th groups of the periodic system.

8. A method according to claim 5 in which the contact mass contains vanadium.

9. A method according to claim 5 in which the contact mass contains vanadium and aluminum.

10. A method according to claim 5 in which methyl alcohol is added to the reacting gases as protective agent.

11. A method according to claim 1 in which the oxygen content of the oxygen containing gas is less than that of air.

12. A method according to claim 5 in which the oxygen content of the oxygen containing gas is less than that of air.

ALPHONS O. JAEGER.